No. 644,741. Patented Mar. 6, 1900.
S. GUTHRIE.
OIL GAS VALVE AND APPARATUS.
(Application filed Aug. 29, 1899.)
(No Model.)

Witnesses,

Inventor
By Samuel Guthrie
Dewey Strong & Co.
Attys

THE NORRIS PETERS CO., PHOTO-LITHO., WASHINGTON, D. C.

UNITED STATES PATENT OFFICE.

SAMUEL GUTHRIE, OF SAN FRANCISCO, CALIFORNIA.

OIL-GAS VALVE AND APPARATUS.

SPECIFICATION forming part of Letters Patent No. 644,741, dated March 6, 1900.

Application filed August 29, 1899. Serial No. 728,821. (No model.)

*To all whom it may concern:*

Be it known that I, SAMUEL GUTHRIE, a citizen of the United States, residing in the city and county of San Francisco, State of California, have invented an Improvement in Oil-Gas Valves and Apparatus; and I hereby declare the following to be a full, clear, and exact description of the same.

My invention relates to an apparatus for continuously feeding oil to the retorts or generators of gas-making apparatus and the valve by which the feed may be regulated and maintained at a constant flow.

It consists of a cock or valve having a peculiarly-shaped port or ports whereby the amount of flow therethrough may be accurately regulated without reducing the openings in such a manner that they are liable to be clogged.

It also comprises details of construction of the apparatus, all of which will be more fully explained by reference to the accompanying drawings, in which—

Figure 1:
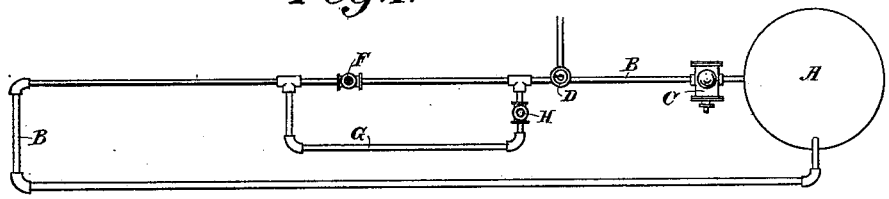
Figure 2:
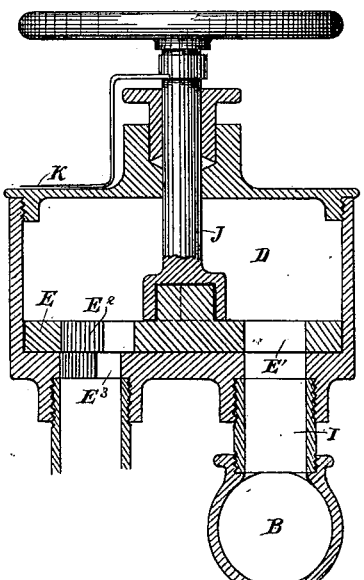
Figure 3:
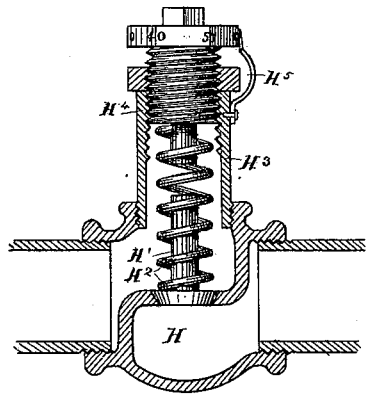
Figure 4:
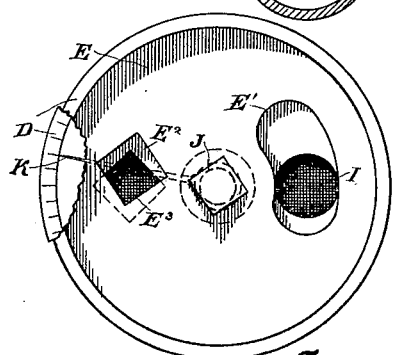

Figure 1 is a general view of the apparatus. Fig. 2 is a section through the valve-chamber and connection. Fig. 3 is a plan view of the valve and its chamber.

A represents a supply-tank; B, a pipe leading therefrom and forming a circuit within which are contained a pump and valves by which the direction and pressure of the liquid are controlled and regulated, said pipe eventually returning into the tank again, so that a continuous circulation of the oil may be kept up.

C is the pump, by which the oil is drawn from the supply-tank A and forced through the pipe B.

D is the valve-chamber, through which the oil passes, and E is a controlling-valve within said chamber, by which the flow to the generator and other portions of the apparatus is controlled.

F is a cock or valve situated in the line of the pipe B, beyond the valve-chamber D.

G is a branch pipe which leaves the main pipe B between the valve-chamber D and the cock F and returns into the main pipe at a point beyond the cock F, as shown.

H is an adjustable pressure-valve situated in the line of pipe G.

The operation of the apparatus is as follows: The pump at C is of any suitable or desired character capable of producing a constant flow of the oil under pressure. Whenever the cock F is open, the oil is free to flow through the circuit of the pipe B and return again to the tank. When it is to feed the oil to the retorts, the cock F may be closed, and the pressure-valve at H is adjusted so that at a certain pressure it will open and allow the oil to flow through it. This valve H has a stem $H'$, surrounded by a spring $H^2$ and extending into a barrel $H^3$, and $H^4$ is a screw-plug entering this barrel and pressing upon the spring $H^2$. By turning this plug into or out of the barrel the tension of the spring is varied and the pressure upon the valve is regulated. In order to show what pressure there may be and to accurately adjust it to the needs of the apparatus, I have shown an indicating-arm $H^5$, fixed to the barrel, and upon the flange of the screw-plug is a marked scale, so that it can be set to provide a pressure of forty pounds or other desired pressure. Under this pressure the pump will then be acting after the valve F has been closed and oil will flow through the valve H, through the by-pass pipe G, back into the pipe B, thence returning to the tank. The valve E in the valve-chamber D controls the flow to the generator. This valve is here shown in the form of a flat disk having an inlet-opening $E'$ made through it and adapted to connect with the opening of a branch pipe I, which leads from the main conducting-pipe B into the bottom of the valve-chamber. The opening $E'$ in the disk is in the form of an elongated segment, which allows the valve to be turned to a considerable distance without closing the passage in the pipe I. Upon the opposite side or at other suitable points with relation to the port $E'$ is made a second port $E^2$. This port is rectangular in shape with two of its angles standing radially from the periphery toward the center of the valve and the other two angles essentially in the line of the arc of travel upon which that portion of the valve turns.

$E^3$ is a passage leading out of the bottom of the valve-chamber beneath the valve E and adapted to be covered or uncovered by the port $E^2$ when the valve is turned. This opening is also made square in shape and in such position with relation to the port E² that when the valve is turned to fully open the passage the two ports exactly coincide and present a rectangular discharge-opening. At this point the elongated port E' on the opposite side of the valve will be in line with the supply-passage I, so that the oil can flow into the valve-chamber through this passage and out through the port E³ with the fullest supply that the valve is capable of.

By turning the valve the port E² can be moved so as to cut off any desired portion of the passage E³, and it will be seen that the passage substantially retains its shape to whatever degree it may be diminished, and I thus present as free an opening as possible consistent with the size, so that the liquid may flow without any danger of its being clogged. By reason of this special form of port I can set the valve E so that under a given pressure, previously determined by the pressure brought upon the valve at H, a certain constant flow of oil may be passed through this valve E to the generator, and when the valve is once set there will be no variation in the supply until a change is made.

The valve-stem J carries an indicating-arm or pointer K, which projects over the circular periphery of the top or cap of the valve-chamber, and this is marked with a scale, which indicates the exact position of the valve and the amount of liquid which will pass through it under the given pressure, which is always indicated, as before described, in connection with the valve H. I have found this form of valve and port to be exceedingly valuable in connection with this apparatus. It may be made, as here shown, as a single port, or if the oil is to be conveyed to different parts of the apparatus—such as the retort, the generator, the carbureter, and other parts—a plurality of these passages may be made in the disk and so arranged with relation to each other as to produce the regulated supply to the parts of the apparatus desired. The same form of port is also applicable to a single cock or valve, the size of the opening in every case being reduced by the meeting of the oppositely-convergent sides of the stationary passage and the movable port, and the reduction of the opening is always made without any substantial change in its shape, thus preventing the clogging of the passage, such as would occur when the port is simply narrowed transversely, while retaining approximately its full length in the other direction. The rectangular form of port also insures an accurate regulation of the amount of flow which passes through under a given pressure and opening of the port.

Having thus described my invention, what I claim as new, and desire to secure by Letters Patent, is—

1. An apparatus for controlling the flow of the liquids consisting of a supply-tank, a pipe departing from and returning to said tank, a pump by which a continuous circulation of liquid within the pipe is produced, means for regulating the pressure within the pipe, and a valve or cock through which the liquid is delivered under pressure, said valve comprising a rectangular or diamond-shaped port, and a correspondingly-shaped passage over which it is adjustable.

2. The combination of a supply-tank, a pipe connected therewith and means whereby a continuous circulation of liquid is produced in said pipe, and means for regulating the pressure within the pipe including a valve having a diamond-shaped port made through it with two of the angles in the line of movement of the valve, and a seat with a connecting passage having a port of the same shape with that of the valve and with two of its angles in the line of movement of the corresponding angles of the valve.

3. The combination of a supply-tank, a pipe connected therewith, means whereby a continuous circulation of liquid is produced in said pipe, and means for regulating the pressure in the pipe including a cock or valve having the diamond-shaped port or ports with two of the angles in the line of travel of the valve, the other two approximately at right angles therewith, and a seat over which the valve moves having a correspondingly-shaped passage coincident in position with the port of the valve whereby the movement of the valve over the port in the seat varies the size of the discharge-opening without materially altering its shape.

4. An apparatus for the transmission of liquids consisting of a tank, a pipe departing from and returning into said tank, a pump situated within the length of the pipe by which the liquid is caused to constantly circulate under pressure, a by-pass pipe, both ends of which connect with the main pipe, a cock or valve situated in the main pipe between the ends of the by-pass whereby the flow of liquid may be stopped in the main pipe and transmitted through the by-pass, and a spring-pressed valve situated in the by-pass pipe with means for regulating the pressure thereon.

5. An apparatus for the transmission and distribution of liquids, consisting of a tank, a pump drawing liquid from the tank, a pipe through which the liquid is transmitted, said pipe returning into the tank, a cock in the length of said pipe whereby the flow therethrough may be interrupted, a by-pass pipe connecting with the main pipe upon each side of said cock, a spring-pressed adjustable tension-valve whereby the flow through the by-pass and the pressure under which it passes are regulated, a valve-chamber connecting with the main pipe between the pump and said pressure-regulating valve, and one or more valves by which the flow from said chamber is regulated.

6. In an apparatus for the distribution of liquids under pressure, a tank, a pump by which liquid is drawn therefrom, a pipe through which the liquid is forced by the pump, said pipe returning into the tank, a cock in said pipe by which the flow may be reduced or cut off, a by-pass, the ends of which connect with the main pipe upon each side of said cock, a tension-valve in said by-pass by which the pressure in the main pipe is regulated when the cock has been closed, a valve-chamber connected with the main pipe between the pump and said pressure-regulating valve, and having one or more delivery-pipes, a valve turnable within said valve-chamber having a diamond-shaped delivery-port, and a corresponding-shaped discharge-passage which it controls, two of the angles of said ports being in the line of movement of the valve and the other two transversely thereto.

In witness whereof I have hereunto set my hand.

SAMUEL GUTHRIE.

Witnesses:
S. H. NOURSE,
JESSIE C. BRODIE.